UNITED STATES PATENT OFFICE.

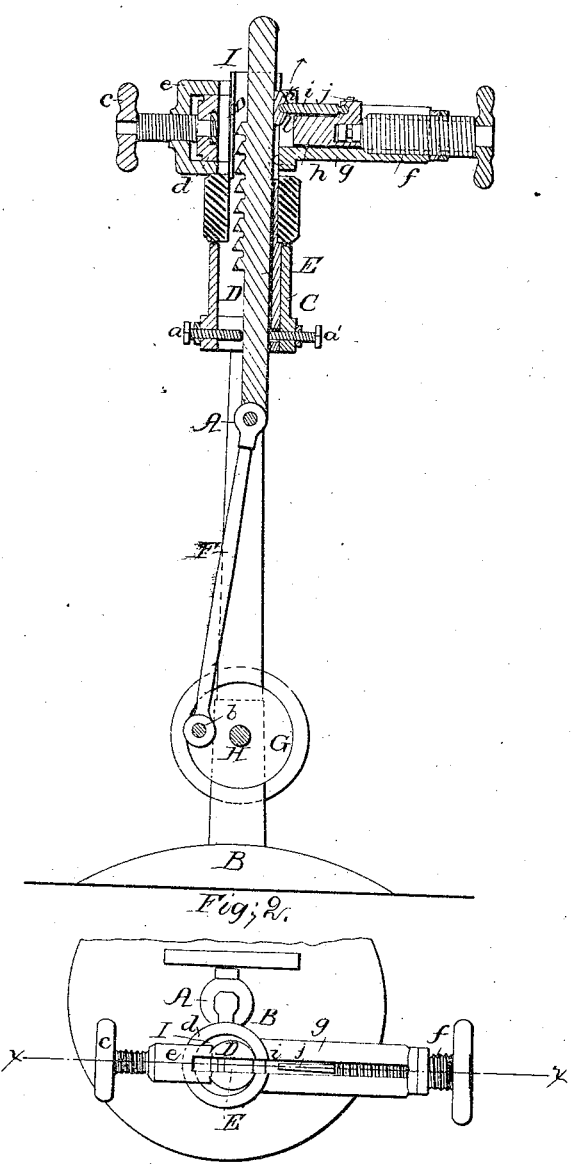

J. C. MORGAN, OF ALLIANCE, OHIO, ASSIGNOR TO WILLIAM A. NIXON AND J. S. EVERHARD, OF SAME PLACE.

IMPROVED MACHINE FOR CUTTING KEY-SEATS.

Specification forming part of Letters Patent No. 46,758, dated March 7, 1865.

*To all whom it may concern:*

Be it known that I, J. C. MORGAN, of Alliance, in the county of Stark and State of Ohio, have invented a new and Improved Machine for Cutting Key-Seats; and I do hereby declare that the following is a full, clear, and exact description thereof, which will enable those skilled in the art to make and use the same, reference being had to the accompanying drawings, forming part of this specification, in which—

Figure 1 represents a vertical section of this invention, the line $x\,x$, Fig. 2, indicating the plane of section. Fig. 2 is a plan or top view of the same.

Similar letters of reference indicate corresponding parts.

This invention consists in a machine provided with a mandrel, which may be fixed or movable, and on which the piece in which the key-seat is to be cut can be chucked. This mandrel is slotted, so as to allow the saw to pass through it, and the saw is adjusted at the requisite angle for cutting by a guide or set-screws which hold the lower part of the same in position. The feeding arrangement is composed of a screw with a dog hinged to a knuckle in such a manner that the saw is thrown forward when cutting and allowed to drop back when not cutting.

A represents a standard which rises from a foot, B, and which may be made of metal or any other suitable material. The upper end of this standard bears a boss or socket, C, which projects therefrom in a lateral direction, as clearly shown in Fig. 2 of the drawings. This socket is bored out large enough to receive the lower end of the mandrel D, on which the piece into which the key-seat is to be cut is chucked. In order to adapt the machine to different piece of work, the mandrel must be made removable, so that it can be taken out and replaced by another, according to the piece of work in which the key-seat is to be cut.

The mandrel D is slotted in a longitudinal direction to admit the saw E, which serves to cut the key-seat, and which is provided with one or more cutters, as may be desirable. The shank of the saw is set to the desired inclination or direction by means of two set-screws or guides, $a\,a'$, which pass through the sides of the socket C near its lower edge, and said shank connects by a pitman, F, with the eccentric wrist-pin $b$, which projects from the disk G, that is mounted on the end of the driving-shaft H. By imparting to this shaft a rotary motion a reciprocating motion is imparted to the saw and the cutting is effected.

The piece of work in which the key-seat is to be cut is held in position by the chuck I, which is clamped to the mandrel D by means of the set-screw $c$. The chuck I is composed of a sleeve, $d$, which fits loosely over the mandrel, and a stirrup, $e$, which straddles the sleeve, is drawn up against the surface of the mandrel by means of the set-screw $c$. The stirrup is slotted, and bears on the mandrel on both sides of the slot in the same manner, so that it will not interfere with the action of the saw. It must be remarked, however, that the chuck might be secured to the mandrel in various different ways, and I do not wish to confine myself to any particular method of accomplishing this object, but I reserve the right to change the same as circumstances may dictate.

The feeding mechanism is composed of a screw, $f$, which is tapped in the end of a tubular projection, $g$, extending from that side of the sleeve $d$ opposite the stirrup $e$. The screw $f$ bears on a slide, $h$, with which it is connected by a pin catching in a collar in such a manner that said screw can be turned independent of the slide, but the slide is compelled to follow the screw in a longitudinal direction, or to move in and out as the screw rotates. The slide $h$ carries the knuckle $i$ which has its bearing in a spherical socket in the sleeve and is held down by a thin spring, $g$. The outer end of the knuckle carries the shoe $k$, and it is connected thereto by a ball and socket or any other suitable joint, as shown in Fig. 1 of the drawings.

By turning the feed screw $f$ in the proper direction the shoe $k$ is brought to bear on the back of the saw, and if the saw moves forward or in the direction in which it cuts, the knuckle $i$ strikes a shoulder, $l$, on the slide, and the saw is held up to the work; but if the saw moves back or in the direction in which it does not cut, the knuckle turns up against the spring $j$ in the direction of the arrow marked near it in Fig. 1, and the saw drops back from the work. By this arrangement the teeth of the saw are saved, and the operation of cutting the key-seat to the requisite depth can be continued without interruption.

I claim as new and desire to secure by Letters Patent—

1. Chucking the piece of work while the key-seat is being cut to a slotted mandrel, which may be fixed or movable, substantially as set forth.

2. Providing the mandrel with a slot, substantially as described, so as to allow the saw to pass through it.

3. The set-screws or guides $a$ $a'$, applied in combination with the socket C, mandrel D, and saw E, substantially as and for the purpose set forth.

4. The knuckle $i$ and shoe $k$, applied in combination with the slide $h$, feed-screw $f$, and saw E, substantially as and for the purpose described.

J. C. MORGAN.

Witnesses:
JOHN W. LYDER,
WILLIAM P. RICE.